United States Patent [19]

Soulier

[11] 4,173,608
[45] Nov. 6, 1979

[54] PROCESS AND APPARATUS FOR THE MANUFACTURE OF EXPANDED PLASTICS MATERIALS

[75] Inventor: Joël Soulier, Ivry la Bataille, France

[73] Assignee: Isobox-Barbier, Bannalex, France

[21] Appl. No.: 839,453

[22] Filed: Oct. 5, 1977

[30] Foreign Application Priority Data

Oct. 22, 1976 [FR] France .............................. 76 31899

[51] Int. Cl.² .................... B29D 27/00; H05B 9/06
[52] U.S. Cl. ...................................... 264/26; 34/1;
219/10.55 A; 219/10.55 F; 264/51; 264/DIG. 9
[58] Field of Search ............... 264/26, 25, 51, 53,
264/DIG. 9, 45.6, DIG. 46; 219/10.55 A, 10.55 F; 34/1

[56] References Cited

U.S. PATENT DOCUMENTS

| 2,459,225 | 1/1949 | Hickok | 264/26 X |
|---|---|---|---|
| 3,010,157 | 11/1961 | Cizek | 264/26 |
| 3,023,175 | 2/1962 | Rodman | 264/DIG. 9 |
| 3,073,036 | 1/1963 | Kostur | 264/DIG. 9 |
| 3,104,424 | 9/1963 | Immel | 264/26 X |
| 3,165,303 | 1/1965 | Paulson | 264/DIG. 9 |
| 3,242,238 | 3/1966 | Edberg et al. | 264/26 |
| 3,263,981 | 8/1966 | Lowry | 264/DIG. 9 |
| 3,265,780 | 8/1966 | Long | 264/46.5 X |
| 3,265,784 | 8/1966 | Jacobs | 264/46.5 |
| 3,288,894 | 11/1966 | Deaton | 264/46.5 X |
| 3,331,899 | 7/1967 | Immel | 264/26 |
| 3,378,245 | 4/1968 | Frank | 264/DIG. 9 |
| 3,379,799 | 4/1968 | Goldman | 264/26 |
| 3,514,576 | 5/1970 | Hilton et al. | 291/10.55 F X |
| 3,549,848 | 12/1970 | Williams | 219/10.55 A |
| 3,555,693 | 1/1971 | Futer | 219/10.55 A X |
| 3,640,913 | 2/1972 | Cerra | 264/26 X |
| 3,758,415 | 9/1973 | Wada | 264/25 X |
| 3,771,234 | 11/1973 | Forster et al. | 34/1 |
| 3,777,095 | 12/1973 | Muranaka | 219/10.55 A |
| 3,834,038 | 9/1974 | Janda | 219/10.55 A X |
| 3,848,038 | 11/1974 | Dench | 264/26 X |
| 3,858,329 | 1/1975 | Koide et al. | 219/10.55 A X |
| 3,973,884 | 8/1976 | Terminiello | 264/DIG. 9 |
| 4,003,554 | 1/1977 | Chauffoureaux | 264/26 X |
| 4,023,279 | 5/1977 | Janda | 34/1 |

FOREIGN PATENT DOCUMENTS

| 259970 | 4/1963 | Australia | 219/10.55 A |
|---|---|---|---|
| 972523 | 1/1951 | France | 219/10.55 A |
| 1471131 | 1/1967 | France | 219/10.55 A |
| 922547 | 4/1963 | United Kingdom | 264/DIG. 9 |
| 953199 | 3/1964 | United Kingdom | 264/26 |
| 1278062 | 6/1972 | United Kingdom | 219/10.55 F |

*Primary Examiner*—Philip Anderson
*Attorney, Agent, or Firm*—Oblon, Fisher, Spivak, McClelland & Maier

[57] ABSTRACT

The present invention provides an apparatus for the manufacture of pre-expanded particles, which comprises in combination a heat-insulated resonating cavity, with a high-frequency electromagnetic source of energy, a ferrite circulater, a wave guide, an Archimedes screw for the introduction of the plastics material to be pre-expanded, a pump for regulating the feed of polar liquid and a device for extracting the pre-expanded particles. The present invention provides also a process for the pre-expansion of particles of plastic material using said apparatus.

10 Claims, 1 Drawing Figure

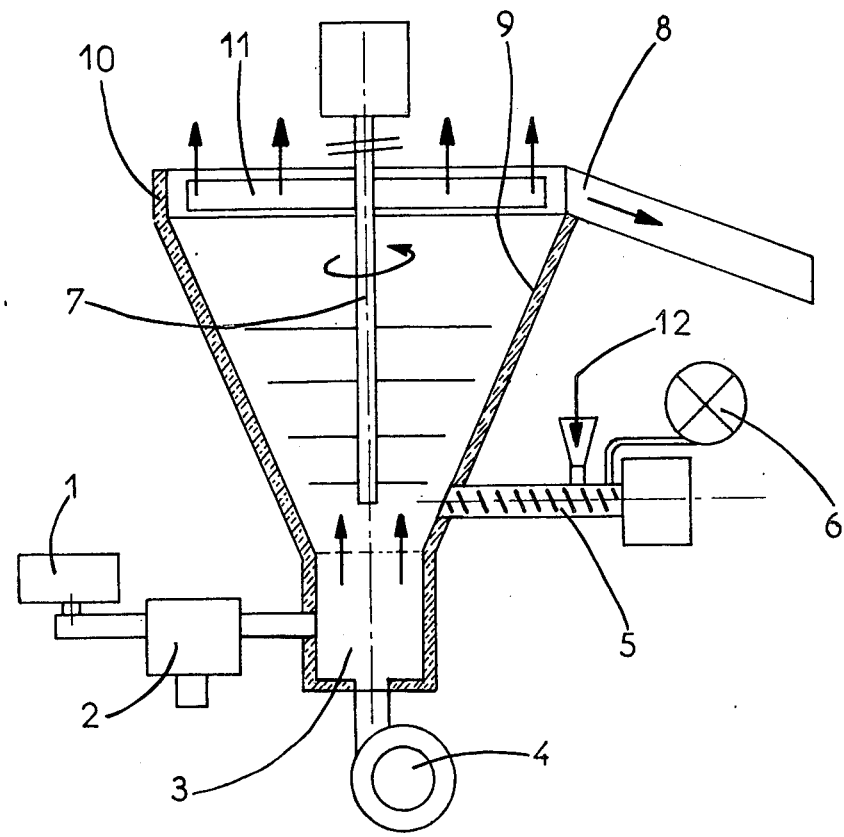

PROCESS AND APPARATUS FOR THE MANUFACTURE OF EXPANDED PLASTICS MATERIALS

The present invention relates to improvements in processes and apparatus for the manufacture of expanded plastics materials.

It is known that a certain number of plastics materials into which there has been introduced a swelling or expanding agent, i.e., an agent capable of being volatilized or decomposed into a gaseous product under the action of heat, undergo an expansion when they are heated and form a foam.

This is true, for example, of polystyrene. The conventional transforming technique comprises introducing a certain amount of non-expanded product into a metal mould and impregnating it with steam under pressure at a temperature sufficient to supply the heat necessary to initiate the expansion process.

This process has several disadvantages, namely
(1) it is a cyclic and therefore slow, system,
(2) it requires a large area and apparatus (boiler, press, etc.)
(3) it can only be carried out by specialists,
(4) the dimensions of the parts produce are limited,
(5) the moulds are relatively expensive.

The manufacture of expanded non-polar plastics materials is also known, in which a non-polar plastics material in the form of particles (balls or beads) containing a swelling agent, is moistened with a polar liquid and the moistened particles are subjected to a high-frequency electromagnetic radiation in a resonating cavity.

This process for the manufacture of plastic materials is advantageously operated in apparatus which contains at the outlet of an extruder a spinneret made of non-absorbent material and having a weak coefficient of friction, which is placed inside a resonating cavity excited by a high-frequency electromagnetic radiation. The polar liquid is heated and vaporised under the action of the high-frequency radiation, thus causing the expansion of the particles.

The process and apparatus described above, and known in the prior art, enable a greater expansion and especially a more regular expansion to be obtained than those obtained by the conventional processes (heating in steam under pressure, for example).

It is often desirable for the particles, balls or beads, used in the manufacture of expanded plastics materials to be partly expanded, or pre-expanded. Attempts at pre-expansion have been effected by means of steam; however, these attempts have the disadvantage of producing pre-expanded balls or beads containing water and needing drying.

The object of the present invention is to provide a process and an apparatus for the pre-expansion of plastics material particles, which enables pre-expanded balls or beads to be obtained which are substantially or entirely free from water, contrary to the pre-expansion practised by means of steam, and are dried during the actual operation of pre-expansion, thus eliminating the need for a drying process following the pre-expansion operation. In this way, the length of treatment as well as its cost may be reduced and the pre-expansion treatment can be carried out continuously. In addition, the process and apparatus according to the present invention enable on the one hand a considerable reduction in the storage time of the expanded particles (known as maturing operation) before the moulding operation, and on the other hand also permit objects of expanded plastic material with a perfect finish to be obtained.

Accordingly, the present invention provides an apparatus for the manufacture of pre-expanded particles, which comprises in combination a heat-insulated resonating cavity, with an ultra high-frequency electromagnetic source of energy, a ferrite circulater, a wave guide, an Archimedes screw for the introduction of the plastics material to be pre-expanded, a pump for regulating the feed of polar liquid and a device for extracting the pre-expanded particles.

Advantageously, the apparatus of the present invention is provided with a hot air blower of which the temperature is between 50° and 100° C. The ultra high-frequency generator is preferably one which functions at between 900 and 10,000 megahertz and has a power between 1 and 200 Kw. The resonating cavity is preferably in the form of a truncated cone with a circular cross section and is provided with an agitator and a grid.

In order to obtain a still better distribution of energy in the resonating cavity, the latter advantageously comprises two wave guides giving a transverse-electric mode $TE_{01}$ and a transverse-magnetic mode $TM_{01}$.

According to an advantageous embodiment of the apparatus of the present invention, the device for extraction of the pre-expanded particles is situated at the top end of the cavity.

The device for extracting the pre-expanded particles may consist of a depression system or may be a mechanical extractor coupled to the axle of the agitator.

The present invention also provides a process for the pre-expansion of particles of plastics material containing a swelling agent, in which the said particles, in the form of balls or spheres, are continuously mixed with a polar liquid, this mixture is continuously introduced into the resonating cavity of the apparatus, associated with a source of ultra high-frequency microwave energy, which vaporizes the polar liquid on the particles of plastics material, causing their expansion, hot air being also introduced into the said cavity for pulsating or agitating the vapour so as to inhibit substantially any condensation on the pre-expanded particles and causing the instantaneous drying of the said particles, after which the dried, pre-expanded particles, are extracted from the cavity.

The polar liquid advantageously consists of water and is introduced in the proportion of 10 to 40% by weight with respect to the weight of the particles to be pre-expanded.

The distribution of the ultra high-frequency energy in the resonant cavity may be improved by crossing two wave polarisations.

The resonating cavity is preferably maintained at a constant temperature, especially between 70° and 100° C., for the whole period of the pre-expansion operation.

In addition to the preceding arrangements, the present invention also comprises other arrangements, which will be evident from the description which follows.

The present invention relates more particularly to the process and apparatus for the manufacture of particles of pre-expanded plastics materials, according to the preceding arrangements, as well as to means suitable for operating these processes and for the production of these apparatus, and the combined processes and the chains of manufacture in which the processes and apparatus according to the present invention are included.

The present invention will now be further described, by way of example, with reference to the accompanying drawing, which is a diagrammatic representation of an apparatus of the present invention.

It must be understood, however, that the example of operation which will be described hereinafter, like the apparatus described below and shown in the drawing, are given only by way of illustration of the object of the invention, but does not in any way constitute a limitation thereof.

The apparatus according to the present invention, in which the pre-expansion operation and drying of the particles of plastic material are carried out, comprises:

a microwave resonating cavity consisting of a circular truncated cone 9, made, for example, of aluminium alloy, excited by a source of ultra high-frequency electromagnetic energy 1, which is constituted by an oscillating magnetron at $F=2\,450$ MHz, by means of a circular wave guide 3 in the mode $TM_{01}$;

a hot air blower 4 75° C.) placed at the base of the cavity;

a feed of plastic material consisting of an Archimedes screw 5 and a hopper 12;

a pump 6 regulating the feed of water;

a mechanical agitator 7, a grid 11 situated in the top part of the cavity, through which the hot air as well as the evaporated water escape;

and an extractor 8 of the expanded particles. The resonant cavity 9 is insulated at 10 against heat.

The functioning of the apparatus according to the invention will be illustrated below, with the aid of a nonrestrictive example, relating to the operation of the process according to the invention in the said apparatus.

60 kg/hour of damp beads of polystyrene are introduced by the feed device 5 into the resonant cavity 9 at the same time as 1 kg of water, which is passed therein by means of the regulating pump 6. The cavity 9 is excited by the ultra high-frequency energy coming from the source 1 by the following method: the circular wave guide 3 is excited by the oscillating magnetron 1 and excites in its turn the cavity 9 in which the vaporization is effected. The mechanical agitator 7 is started in order to reduce the agglomerates which could be formed.

The ultra high-frequency microwave energy vaporises the water in suspension on the beads, which are expanded. The steam and hot air (which pulsates or agitates the steam and reduces, or even suppresses, the risks of condensation on the pre-expanded beads) escape through the grid 11, while the dry pre-expanded beads (at 0–0.5% of humidity) are extracted by the extractor 8. This extraction may be effected either by means of a depression system or by means of a mechanical extractor coupled on the axle of the agitator.

In order to expand 1 kg of polystyrene beads of final density of 20 g/liter, 120 Kc are necessary, i.e., 0.14 Kw/hour at 2 450 MHz. 50 Kg per hour of dry beads are thus extracted (about 0.2% of water).

As the apparatus works continuously, it is necessary to isolate the magnetron 1 from the reflected waves which could be formed in the case of insufficient charge, by means of a ferrite circulator 2. Such an arrangement prolongs the life of the magnetron.

From the preceding description it follows that whatever may be the method of operation, realization and application adopted, processes and apparatus for continuous manufacture of particles (balls or beads) of partially expanded, or pre-expanded, plastic material are obtained from it, which in comparison with the processes and apparatus aiming at the same end, but previously known, have important advantages, besides those which have been mentioned in the above specification, and especially:

The advantage of permitting a total continuity of the manufacture;

The advantage of permitting the immediate use of the pre-expanded beads, which brings with it a reduction of the volume of the installations on account of the suppression of the storage, and consequently, a reduction in the industrial cost;

The advantage of vaporising the water within the particles, thus causing the uniform distribution of the material and this at atmospheric pressure, and the elimination of any risk of agglomeration;

The advantage of permitting a perfectly dry material to be obtained from the evaporation of the residual water vapour contained in the particles, by heating through the walls of polystyrene (which is totally transparent at $F=2\,450$ MHz); and The advantage of obtaining a final product of which the quality is appreciably improved compared with that of the products obtained on use of the processes and the apparatus previously known.

As well as that which has gone before, the invention is not at all limited to those of its methods of operation, realisation and application which have just been described more explicitly. On the contrary it includes all the variants which may occur to the technician in the matter, without departing from the spirit or the scope of the present invention.

I claim:

1. A process for the pre-expansion of particles of thermoplastic resin material containing an inflating or expanding agent, said process comprising the steps of:
   continuously mixing small particles of said thermoplastic resin material with a polar liquid;
   continuously introducing said mixture into a resonant chamber communicating with a source of ultra-high frequency electro-magnetic or microwave energy;
   introducing said ultra-high frequency electro-magnetic microwave energy into said resonant chamber to vaporize said polar liquid on said plastic particles whereby said particles are caused to expand;
   introducing hot air into said chamber to pulse or agitate said vapor whereby condensation of said vapor on said pre-expanded particles is prevented and said particles are dried; and
   extracting said dried pre-expanded particles from said resonant chamber.

2. Process of claim 1, wherein said polar liquid is composed of water and is introduced in the proporation of 10–40% of the weight of said particles to be pre-expanded.

3. Process of claim 1, wherein two wave polarizations are crossed so as to improve the distribution of ultra-high frequency energy in said resonant chamber.

4. Process of claim 1, wherein said resonant chamber is kept at a constant temperature, preferably between 70° C. and 100° C., during the entirety of said pre-expansion operation.

5. An installation for the manufacture of pre-expanded thermoplastic resin particles, said installation comprising:
   an insulated resonant chamber;

a source of ultra-high frequency electromagnetic microwave energy;

at least one waveguide for communicating said electromagnetic energy between said source and the base of said resonant chamber;

a ferrite circulator connected between said source and each said waveguide;

screw feed means communicating with said resonant chamber downstream of said wave guide and also communicating with a source of unexpanded particulate thermoplastic resin material;

hot air blower means adapted to introduce air at a temperature of 50° C. to 100° C. into the base of said resonant chamber for agitating and drying said material;

polar liquid pump means communicating with said screw means for moistening said unexpanded particulate thermoplastic resin material with a polar liquid prior to its introduction into said resonant chamber; and means at the upper extremity of said resonant chamber for extracting said pre-expanded particles.

6. Installation of claim 5, wherein said ultra high frequency generator functions between 900 and 10,000 MHz and is of a strength of between 1 and 200 Kw.

7. Installation of claim 5, wherein said resonant chamber is truncated, with a circular cross-section, and is equipped with an agitator downstream of the screw feed means and has a grid at the upper extremity of said chamber and adapted to permit escape of the hot air and the evaporated polar liquid.

8. Installation of claim 5, wherein said installation comprises two waveguides offering a transverse-electric mode $TE_{01}$ and a transverse-magnetic mode $TM_{01}$.

9. Installation of claim 5, wherein said pre-expanded particle extraction means is constituted by a depression system.

10. Installation of claim 7, wherein said pre-expanded particle extraction means is a mechanized extractor coupled to the axis of said agitator.

* * * * *